United States Patent [19]

Loewe et al.

[11] Patent Number: 5,325,902

[45] Date of Patent: Jul. 5, 1994

[54] AUTOMATIC TIRE PRESSURE MONITOR AND INFLATION SYSTEM

[76] Inventors: Richard T. Loewe, 12882 Olympia Way, Santa Ana, Calif. 92705; Gary B. Shelly, 237 Lanai La., Placentia, Calif. 92670; Fredrick M. Moran, 1436 E. Northshore Dr., Tempe, Ariz. 85283

[21] Appl. No.: 901,240

[22] Filed: Jun. 19, 1992

[51] Int. Cl.⁵ .................................. B60C 23/00
[52] U.S. Cl. .................................. 152/419; 152/418
[58] Field of Search ............... 152/415, 418, 419, 420, 152/421, 422; 310/75 R, 76; 322/1

[56] References Cited

U.S. PATENT DOCUMENTS

| | | | |
|---|---|---|---|
| 1,128,455 | 2/1915 | Keith | 152/418 |
| 1,229,039 | 5/1917 | Crane | 152/420 |
| 2,577,458 | 12/1951 | Gaiptman | 152/416 |
| 3,099,309 | 7/1963 | Horta | 152/416 |
| 3,511,294 | 5/1970 | Bepristis et al. | 152/418 |
| 4,154,279 | 5/1979 | Tsuruta | 152/416 |
| 4,313,483 | 2/1982 | Brockmann | 152/416 |
| 4,418,737 | 12/1983 | Goodell et al. | 152/416 |
| 4,582,107 | 4/1986 | Scully | 152/417 |
| 4,583,566 | 4/1986 | Kalavitz et al. | 137/101.19 |
| 4,619,303 | 10/1986 | Bryan et al. | 152/416 |
| 4,685,501 | 8/1987 | Williams | 152/417 |
| 4,744,399 | 5/1988 | Magnuson et al. | 152/417 |
| 4,754,792 | 7/1988 | Braun et al. | 152/417 |
| 4,763,709 | 8/1988 | Scholer | 152/416 |
| 4,875,509 | 10/1989 | Da Silva | 141/38 |
| 4,924,926 | 5/1990 | Schultz et al. | 152/417 |

FOREIGN PATENT DOCUMENTS 1011756 7/1957 Fed. Rep. of Germany .

Primary Examiner—Michael W. Ball
Assistant Examiner—Francis J. Lorin
Attorney, Agent, or Firm—Stetina and Brunda

[57] ABSTRACT

A device for maintaining a desired inflation pressure within the tire utilizes a motor and air compressor disposed upon the rotating wheel to eliminate the requirement for a rotary pneumatic joint. The air compressor provides a source of air for maintaining inflation pressure and is driven by a DC motor. The motor is, in turn, driven by a generator which is partially disposed upon the rotating wheel and partially disposed upon a non-rotating portion of the vehicle. A stationary magnet attached to a non-rotating portion of the vehicle defines the generator's stator. Windings which define the generator's armature are formed upon a substrate which is applied to the rotating wheel such that the windings pass within close proximity to the stationary magnet. The air compressor may alternatively be mechanically driven directly by the rotation of the wheel.

14 Claims, 3 Drawing Sheets

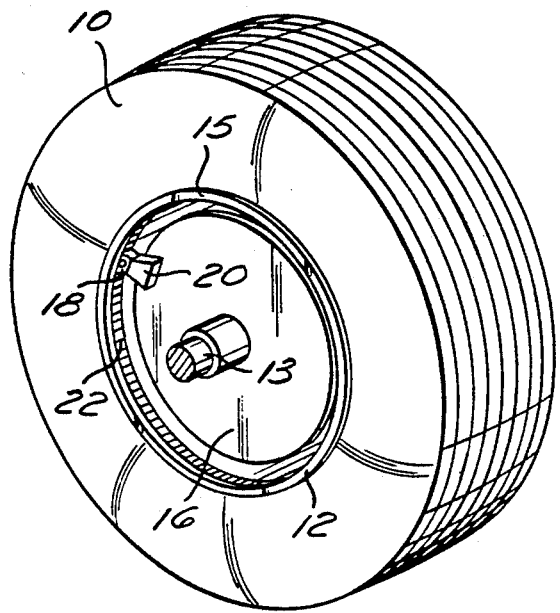
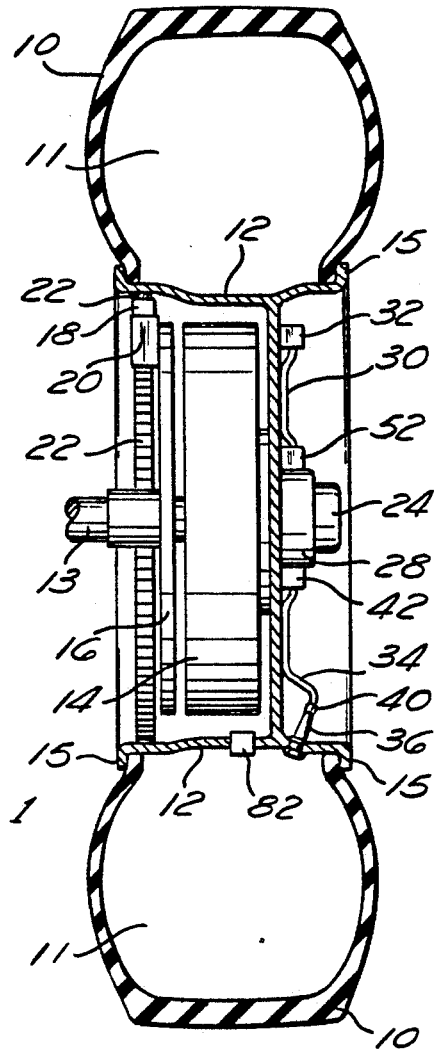
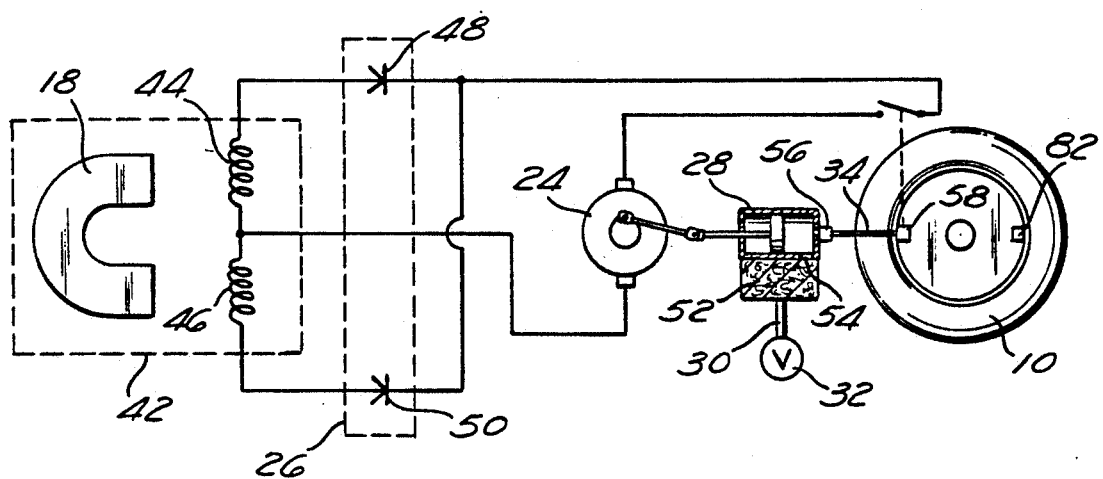

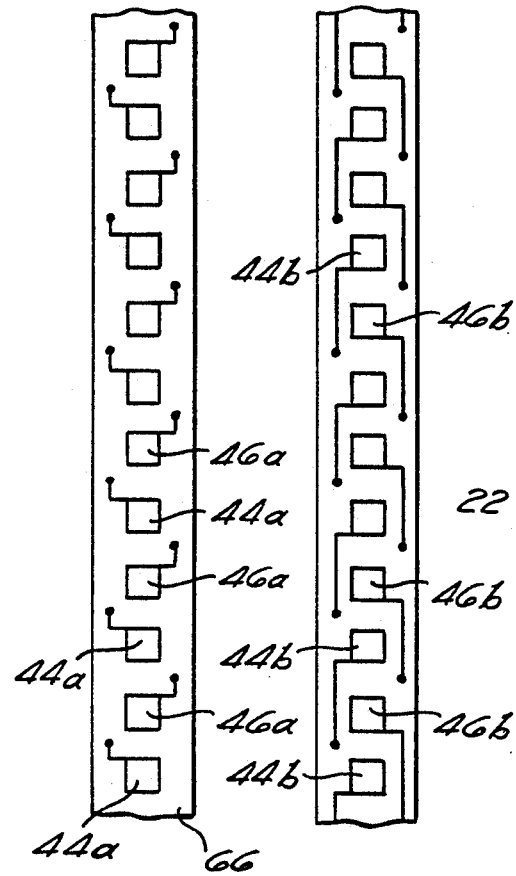
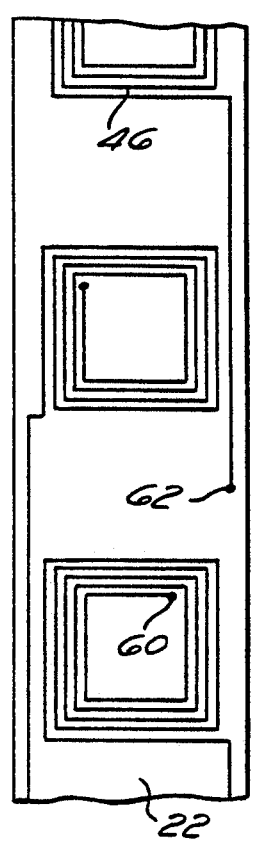
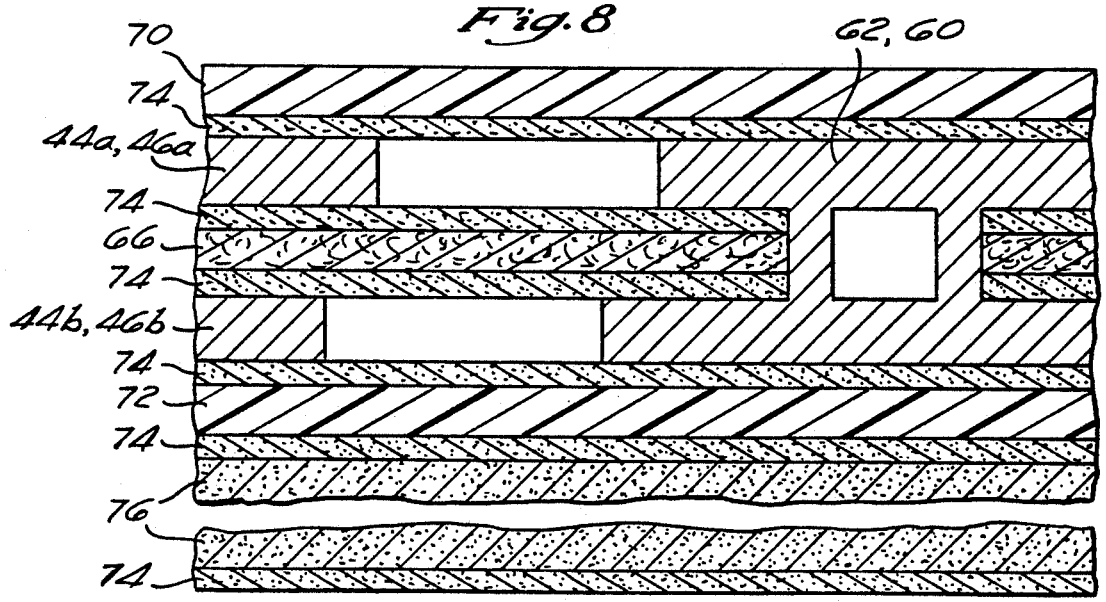

AUTOMATIC TIRE PRESSURE MONITOR AND INFLATION SYSTEM

FIELD OF THE INVENTION

This invention relates generally to fluid pressure control systems and more particularly to an automatic tire pressure monitor and inflation system for maintaining a desired inflation pressure within vehicle tires.

BACKGROUND OF THE INVENTION

The desirability of maintaining correct inflation pressure in automobile tires and the like is well established. Improper tire inflation has been determined to decrease fuel economy, increase tire wear, and decrease safety. Optimum fuel economy results when automobile tires are inflated to the proper pressure where the rolling resistance of the tire is minimized. Over-inflation causes excessive wear near the middle of a tire's tread as the tire bulges outward. Conversely, under-inflation results in excessive wear at the edges of a tire's tread as the tire flattens. The United States National Highway Traffic Administration reported that 1.5 billion dollars in tire wear could be saved annually by proper tire inflation.

Safety is enhanced by proper tire inflation due to the improved control afforded thereby. The United States Highway Traffic Safety Administration reported that 260,000 accidents, 28,000 injuries, and 720 deaths were caused by improper tire inflation in a single year.

Although proper tire inflation may be maintained by regularly checking tire pressure and adjusting it accordingly, this procedure tends to be largely ignored because of the inconvenience involved. Furthermore, tire pressure varies with the temperature of the air in the tire and is consequently effected by vehicle speed, road surface, and ambient temperature.

Improved traction may be achieved by varying the inflation pressure depending upon the surface over which the vehicle is to be driven. Driving a vehicle over a hard surface, i.e. a paved road, is more efficiently accomplished with tires having a higher inflation pressure than is required to drive the same vehicle over a softer surface. Increased pressure is desirable when driving over a hard surface because it results in relatively low tire surface area contacting the road surface and consequently results in reduced tire wear and improved rolling resistance. However, greater traction is generally required when traveling over softer surfaces, i.e. sand or snow. Increased tire traction may be achieved by reducing the tire's inflation pressure. Such reduced inflation pressure results in an increase in the surface area of the tire in contact with the driving surface, thus enhancing traction.

Variations in tire inflation pressure also result from changes in the payload or weight carried by the vehicle. Increasing the payload increases the force exerted upon the tires. This necessitates a corresponding increase in tire pressure in order to maintain the optimum contact area of the tire upon the driving surface.

Systems for automatically inflating and deflating vehicle tires are well known. Typical among such systems are those which allow an operator to vary the pressure within a vehicle's tires as desired. Such systems are disclosed by U.S. Pat. No. 2,634,783, issued to Turek; U.S. Pat. No. 2,989,999 issued to Holbrook; U.S. Pat. No. 3,276,502 issued to Ruf; and U.S. Pat. No. 4,418,737 issued to Goodell et al. In each of these prior art tire inflation systems, air is provided from an air source located within the vehicle to the rotating tires via the use of rotary pneumatic joints and seals.

The use of such rotary seals involves several inherent disadvantages. Foremost, is the complexity of the installation, which increases both the cost and the potential for maintenance problems. Additionally, such rotary joints are necessarily operated in an environment which is inherently hostile to their performance. Various contaminants such as oil, water, dirt, and sand are almost continually present and thus represent a potential hazard to the integrity of the seal. The hostility of the environment is further aggravated by potential use of the vehicle upon unpaved surfaces whereby the vehicle is additionally subjected to rigorous shock and vibration.

Thus, although such automatic tire inflation systems are technically feasible for their intended purposes, they possess inherent economic and practical deficiencies which detract from their overall effectiveness in the marketplace.

SUMMARY OF THE INVENTION

The present invention alleviates the above mentioned problems associated with the prior art. It comprises a device for maintaining a desired inflation pressure within the tire which utilizes an air compressor disposed upon the rotating wheel to eliminate the requirement for a rotary seal. The air compressor provides a source of air for maintaining inflation pressure. The air compressor is driven by the centrifugal or inertial forces present in a rotating wheel or is driven by an electrical motor, which, in turn, is driven by a generator based on the rotation of the wheel. As such, tire inflation is provided directly or indirectly from the normal rotation of the vehicle wheel.

The generator is partially disposed upon the rotating wheel and partially disposed upon a non-rotating portion of the vehicle. A stationary magnet attached to the non-rotating portion of the vehicle defines the generator's stator. Windings, which define the generator's armature, are formed upon a substrate, preferably flexible, which is applied to the rotating wheel such that the windings pass within close proximity to the stationary magnet. The armature member is preferably composed of a strip of tape having a printed circuit formed thereon.

The requirement for a rotary joint is thus eliminated by utilizing a self-contained pressure source upon the wheel itself. A pressure switch monitors inflation pressure to effect actuation of the motor when an under-pressure situation is detected. A relief valve may be utilized to prevent over-inflation although the compressor design may preclude over-inflation.

The printed circuit tape comprises windings formed upon a substrate, preferably upon both sides thereof. Two series of windings are preferably utilized. The coils of each series of windings are interspersed longitudinally along the tape with the coils of the other series. Each coil is preferably defined by an inward spiral disposed upon one side of the substrate and an outward spiral formed upon the opposite side of the substrate. Plated throughholes or vias in the substrate connect those portions of each coil formed upon opposite sides of the substrate such that a single coil is defined thereby. The substrate may be of a flexible material to facilitate fabrication and installation.

Longitudinally adjacent windings are electrically isolated from each other while alternate windings, i.e. every other winding, are connected in series. Thus, two series of coils are configured to generate AC waveforms that are 180 degrees out of phase such that rectification will produce a continuous DC output. The printed circuit may optionally use more than two layers to achieve a larger number of windings.

The substrate preferably has a pressure sensitive adhesive layer upon one side thereof such that it may be bonded to the inside of a wheel's rim. When the substrate is utilized in conjunction with a non-ferrous, e.g. aluminum, wheel, a layer of material with high magnetic permeability is added to the tape. This layer is preferably disposed between an outer protective and insulating layer and the adhesive layer to optimize passage of magnetic flux from the permanent magnet through the coils.

An intake air filter is attached to the input of the compressor. A centrifugal entry valve is located at the outer end of a thin air tube running from the filter radially outward toward the rim to prevent the entry of water or other contaminants. The centrifugal entry valve remains closed until the wheel is rotating fast enough for centrifugal force to expel any water disposed within the intake tube.

In an alternative embodiment, the generator and rectifier are replaced with the vehicle battery and a rotating electrical joint or slip ring to provide electricity to the motor disposed upon the rotating wheel. Such a rotating electrical joint or slip ring arrangement may also be utilized to send tire pressure information from the rotating wheel to an indicator disposed upon the dashboard of the vehicle and similarly permit communication of control signals from the dashboard to the wheels in order to vary the desired inflation pressure. A rotating electrical joint is simpler and more practical than a rotating pneumatic (fluid) joint.

These, as well as other advantages of the present invention will be more apparent from the following description and drawings. It is understood that changes in the specific structure shown and described may be made within the scope of the claims without departing from the spirit of the invention.

BRIEF DESCRIPTION OF THE DRAWINGS

FIG. 1 is a cross-sectional view of an automobile wheel incorporating the automatic tire pressure monitor and inflation system of the present invention;

FIG. 2 is a perspective view of the automobile wheel of FIG. 1 showing the generator formed thereon;

FIG. 3 is a schematic representation of the automatic tire pressure monitor and inflation system of the present invention;

FIG. 4 is a top plan view of the windings showing the inner or first layer of coil sections and the location of their corresponding vias;

FIG. 5 is a top plan view of the outer or second layer of coil sections formed upon the opposite side of the substrate and likewise showing the location of the vias;

FIG. 6 is an enlarged view of the coil sections of FIG. 4;

FIG. 7 is an enlarged view of the coil sections of FIG. 5; and

FIG. 8 is a cross sectional view of the windings of FIGS. 4 and 5 additionally including the adhesive layers, protective, and magnetically permeable layers.

DETAILED DESCRIPTION OF THE PREFERRED EMBODIMENT

Figure 9:
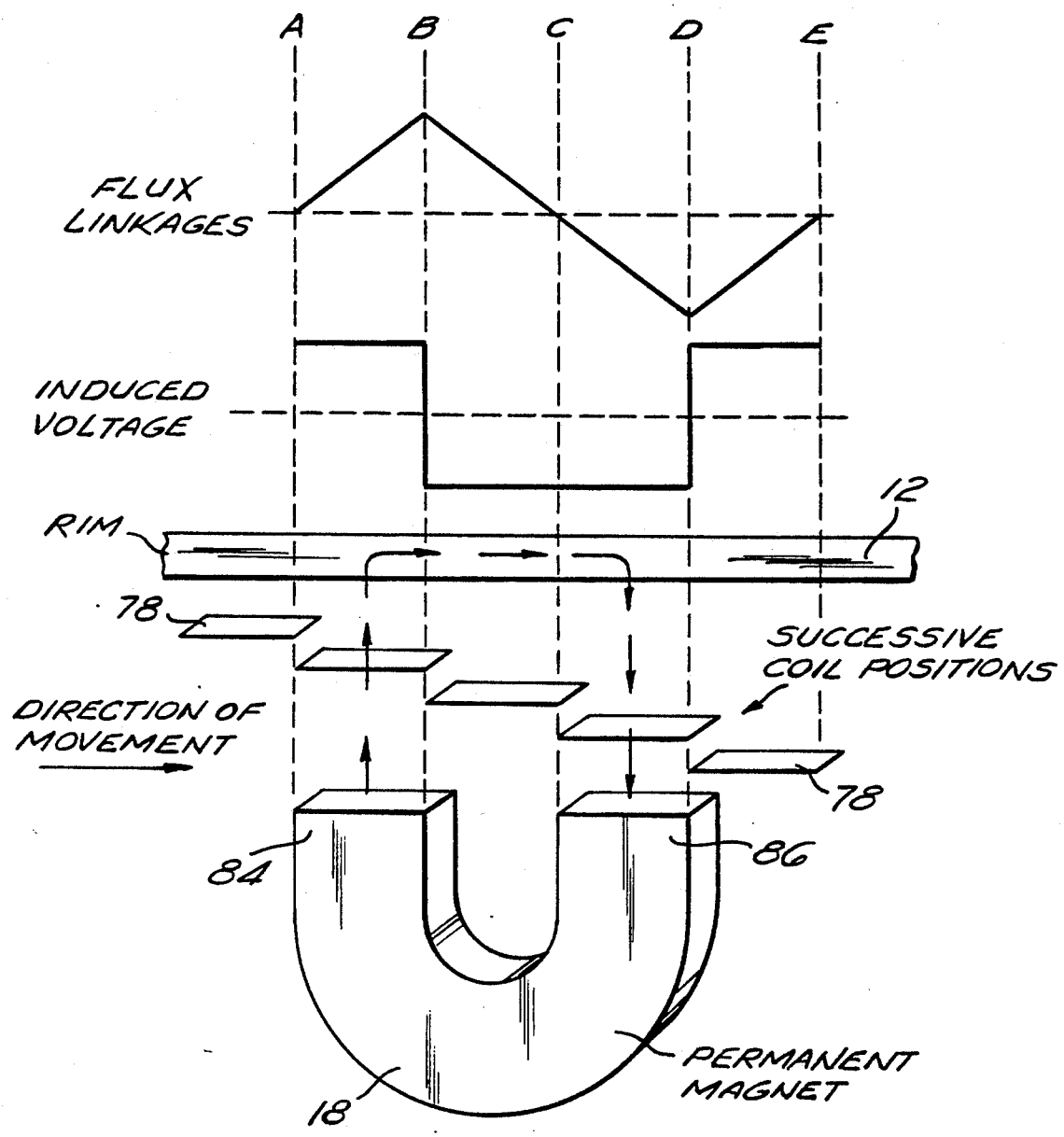
FIG. 9 is a graphical representation of the flux linkages and voltages generated by the generator.

The detailed description set forth below in connection with the appended drawings is intended as a description of the presently preferred embodiments of the invention, and is not intended to represent the only forms in which the present invention may be constructed or utilized. The description sets forth the functions and sequence of steps for constructing and operating the invention in connection with the illustrated embodiments. It is to be understood, however, that the same or equivalent functions and sequences may be accomplished by different embodiments that are also intended to be encompassed within the spirit and scope of the invention.

The automatic tire pressure monitor and inflation system of the present invention is illustrated in FIGS. 1 through 9 which depict a presently preferred embodiment of the invention. Referring now to FIGS. 1 and 2, a vehicle wheel rim 12 supports a tire 10 and is mounted to an axle 13.

The automatic tire pressure monitor and inflation system of the present invention is described and illustrated in conjunction with a wheel utilizing a drum brake system. Such use of the present invention with a wheel utilizing a drum brake system is by way of illustration only and not by way of limitation. Those skilled in the art will recognize that the automatic tire pressure monitor and inflation system is likewise suitable for use with other types of braking systems, i.e. disk brakes. The drum brake system comprises a drum or rotating portion 14 and a backplate or stationary portion 16 to which the brake shoes (not shown) are mounted.

The automatic tire pressure monitor and inflation system of the present invention generally comprises a generator (comprised of one or more permanent magnets 18 and coil tape 22 and rectifier), a DC motor 24, a compressor 28, a pressure switch 42, a centrifugal intake valve 32, an air filter 52, a tire inflation valve 36, and associated electrical wiring and air tubing.

The coil tape 22 comprises individual coils as described below which interact with the magnet 18 to define a generator for providing electric power to the DC motor 24. The coil tape 22 is disposed upon the rotating wheel rim 12 such that the individual coils formed thereon move past permanent magnet 18 and through the flux developed thereby.

Although illustrated in FIG. 1 as being proximate the outer-most portion of the axle, the DC motor 24 and compressor 28 may alternatively be disposed within the pressurized volume 11 defined by the tire 10 and wheel rim 12, preferably entirely within the pressurized volume defined solely by the rim such that no portion of the DC motor 24 and air compressor 28 extends out of the volume of the rim. Such construction would provide a measure of physical protection to the DC motor 24 and compressor 28 by the side walls 15 of the wheel rim 12 during handling, transportation, and usage. For example, a flat occurring during usage wherein the tire 10 becomes completely deflated and the side wall 15 of the wheel rim 12 comes to rest upon the road surface, would not inflict damage upon the DC motor 24 or compressor 28 disposed entirely within the wheel rim 12.

The stationary magnet 18 is disposed upon a stationary portion of the vehicle such as the backplate 16 of the drum brake system. Those skilled in the art will recognize that various other mounting locations are likewise suitable. The magnet 18 is attached to the backplate 16 of the vehicle's drum brake system via magnet mount 20. The magnet mount 20 attaches to the magnet 18, to position the magnet 18 in close proximity to coil tape 22 positioned upon a moving part of the wheel, i.e. the wheel rim 12, such that a generator is defined by the stationary magnet 18 and conductive coils 44 and 46 (best shown in FIGS. 4–8) formed upon the coil tape 22.

A DC motor 24 is in electrical communication with the generator defined by the stationary magnet 18 and rotating coil tape 22 such that the DC motor 24 may be powered thereby. A rectifying circuit 26 (FIG. 3) may be electrically connected intermediate the generator (magnet 18 and coil tape 22) and the DC motor 24. As is well known in the art, filtering circuitry may additionally be added as required in order to smooth the output waveform of the generator comprised of magnet 18 and coil tape 22.

Air compressor 28 is in mechanical communication with the DC motor 24 such that it is driven thereby. The input to the air compressor 28 is connected via input tubing 30 to a centrifugal air valve 32 disposed several inches from the axle 13 centerline upon the wheel such that substantial centrifugal force is experienced thereby during wheel rotation. An air filter 52 is disposed intermediate the centrifugal intake valve 32 and the compressor 28. The output of the compressor 28 is connected via output tube 34 to tire inflation valve 36 which provides fluid communication through the wheel rim 12 into the interior 11 of the tire 10. The tire inflation valve 36 normally associated with contemporary automobile wheel construction may be utilized by providing a threaded connector 40 at the distal end of the output tube 34 to place the output tube 34 in fluid communication with the interior 11 of the tire 10. Alternatively, the compressor output may be connected to the tire volume by a separate hole in the rim.

A pressure switch 42 is in fluid communication with the interior 11 of the tire 10 such that the pressure of the air disposed therein may be monitored. The pressure switch 42 is additionally in electrical communication with the DC motor 24 such that the switch activates the DC motor upon sensing of tire pressure below a predetermined level. The pressure switch is located between the compressor 28 output and the tire inflation valve 36. However, those skilled in the art will recognize that various locations, in fluid communication with the interior 11 of the tire 10, are likewise suitable for monitoring the pressure of the air within the tire 10.

With particular reference to FIG. 2, the wheel is depicted in a perspective side view to better illustrate the positions and structures of the components of the generator comprised of magnet 18 and coil tape 22. As can be appreciated, rotation of the tire 10 causes a like rotation of the coil tape 22 proximate the stationary magnet 18 such that an electrical voltage will be induced into the conductors or coils defined by coil sections 44a, 44b, 46a, and 46b (as shown in FIGS. 4–8) formed upon the coil tape 22.

Referring now to the schematic representation of the present invention provided in FIG. 3, a generator 42 is comprised of: the magnet 18, first 44 and second 46 generator coils (comprised of coil sections 44a, 44b, 46a, and 46b and best illustrated in FIGS. 4–8). The first 44 and second 46 generator coils are preferably in electrical communication with a rectifying circuit 26 comprising first 48 and second 50 diodes. The rectified output of the rectifying circuit 26 is supplied to DC motor 24 which drives air compressor 28. The output of the rectifying circuit 26 may be filtered as required for better operation of the DC motor 24.

Those skilled in the art will recognize that various other types of electrical drive devices are likewise suitable for driving air compressor 28. The use of a DC motor is preferred because of the relative independence of its operational efficiency with respect to the output frequency of generator 42.

As can be seen, the centrifugal intake valve 32 is in fluid communication with input tubing 30 having filter 52 disposed therealong and connected to the input 54 of the compressor 28. The centrifugal intake valve 32 permits immersion in water, without allowing water into the input tube. Centrifugal force drives out water from the intake tube 30 when the centrifugal intake valve 32 is open. Thus the intake valve 32 ensures that no water can enter the compressor 28 through the filter 52 and the intake orifice 54. The output of the compressor 28 is in fluid communication with the interior 11 of the tire 10 via output tube 34.

The air filter 52 keeps contaminating elements from the external environment from entering the air compressor 28 and thus causing damage thereto or accumulating in the tire. The air filter 52 may utilize pressurized air from the compressor 28, tire 10 and/or the motion of the wheel to blow and/or brush away contaminants from the air filter 52. Thus, air periodically released from the tire 10 may be directed out through the air filter 52 to help clean the air filter 52.

An automatic pressure deflation or relief valve 82 may be utilized to release air from the tire 11 to the atmosphere and thereby prevent over-inflation. Those skilled in the art will recognize that various relief valves are suitable. The pressure at which the pressure relief valve 82 is actuated may be selectable, possibly by varying an electronic control. Thus, a single control may be utilized to determine the pressure at which the compressor 28 adds air to the tire 10 and the pressure at which the relief valve 82 releases pressure from the tire 10.

A mechanical adjustment means, e.g. screw driver operated, may be provided to permit manual adjustment of the preset values for activating or deactivating the compressor 28 as well as for varying the actuation pressure of the relief valve 82, thereby facilitating selection of the desired pressure or pressure range of the tires. A first preset value determines the pressure at which the compressor 28 begins to pump air into the tire 10. A second preset value determines the pressure above which the compressor 28 ceases to pump air into the tire 10. A third preset value determines the pressure above which the relief valve 82 releases air from the tire.

An indicator may be provided to display the tire pressure and/or leak rate. The leak rate is directly related to the frequency of compressor operation. By providing an indication of the leak rate, the condition of the tires may be evaluated.

A central monitoring system may be mounted on the vehicle frame and receive data transmitted from each wheel to display tire pressure information to the driver. Information from each wheel is transmitted to the central monitoring device on the vehicle. The central monitoring system displays the information on the dash board of the vehicle. If a physical contact is utilized to bring battery power to the wheel, that same circuit may be utilized to send information back from the wheel to the frame. In the absence of such a physical contact, the information may be transmitted from the wheel to the frame by various means such as electromagnetic radiation, infrared radiation or ultrasonic radiation. A central receiver receives the coded transmissions and sends the data to a display on or near the dashboard. An audible alarm can be utilized to alert the driver to any abnormal conditions.

Various means of multiplexing the transmissions from each wheel to the central monitoring device are contemplated. For example, messages from each wheel could be sent at random intervals so that messages are interspersed as in the Aloha multiplexing method. Colliding messages are then ignored at the receiver since the data is repeated frequently and collisions are rare. Wheel identification or location is included in the coded data transmitted. A manual setting, i.e. screwdriver adjustment, on each wheel may indicate wheel ID or location. If the wheel ID is encoded, the central monitor keeps track of which wheel ID is in each location on the vehicle by manual entry or through the use of an automatic sensor.

A transmitter in the central monitor system and receivers on each wheel allow the driver to adjust tire pressure settings in each wheel. The same circuit that transmits information from the wheel to the central monitor may be utilized to transmit commands from the central control to the wheel.

In any event, the automatic tire pressure monitor and inflation system may be mounted on the wheel or partly in a wheel cover, i.e. hubcap, and balanced such as not to affect the wheel balance. The weight of the components added to the wheel, e.g. compressor, filter, valves, motor, coils, is balanced by distributing those components around the wheel and by considering their weight distribution in the design of the wheel. As is well known to those skilled in the art, counterweights may be used to balance the wheel. Placing heavier items such as a motor, if any, close to the center of the wheel and lighter items such as filters, further out on the opposite side reduces the need for counterweights.

Referring now to FIGS. 4-8, the coil tape 22 is shown. The coil tape 22 comprises a substrate or circuit board 66 having printed circuits formed thereupon to define first coils 44 (comprised of coil sections 44a an 44b) and second coils 46 (comprised of coil sections 46a and 46b).

The coil tape 22 contains individual coils 44a, 44b, 46a, and 46b (as illustrated in FIGS. 4-7). The coil tape 22 is comprised of two separate sets of coils, each set containing a plurality of coils electrically connected in series. The two sets of coils are interspersed longitudinally along the length of the coil tape 22. That is, every other coil along the length of the coil tape 22 is of a given series. Each coil, regardless of which series, is comprised of two coil sections (a & b) and is positioned to provide continuous voltage output, one section formed upon either surface of substrate or printed circuit board 66. The two coil sections 44a and 44b or 46a and 46b, disposed upon either side of the printed circuit board 66, are electrically connected by throughhole via 60 and 62 formed within the substrate 66.

Thus, a first series of coils is longitudinally interspersed with a second series of coils. Each coil of either series is comprised of two separate coil sections, one coil section disposed upon either side of the printed circuit board 66. Each coil section 44a and 44b, taken together, define a single coil and each coil section 46a and 46b, taken together, define a separate coil. Therefore, the two sets of alternately interspersed coils define two separate coil circuits which are positioned and configured to optimize the flux linkage with a horseshoe-type permanent magnet such that maximum voltage may be generated thereby.

Those skilled in the art will recognize that the coil sections 44a, 44b, 46a, and 46b may be formed by depositing conductive conduits upon the printed circuit board as is common in printed circuit fabrication. Alternatively, the coil sections 44a, 44b, 46a, and 46b may be fabricated by conventional coil winding. The coil sections 44a, 44b, 46a, and 46b are preferably formed generally into rectangular spirals such that the resulting voltage waveform generated thereby is generally rectangular in shape, as discussed below.

With particular reference to FIG. 8, a cross-section of the coil tape 22, the coil sections 44a, 44b, 46a, and 46b and formed upon the circuit board substrate 66, are covered with protective films 70 and 72. The protective films 70 and 72 preferably comprise a insulator such as a polymer material. Those skilled in the art will recognize that various other materials are likewise suitable. Layers of adhesive 74 bond the circuit substrate 66 to the copper 44a, 46a and 44b, 46b and the copper to the protective films 70 and 72. An adhesive layer 74, preferably approximately 0.001 inch thick, is formed upon one surface of the coil tape 22 such that the coil tape 22 may be adhesively bonded to a rotating surface of the wheel. A magnetically permeable layer 76 may be formed between the protective layer 72 and the adhesive layer 74 to provide a path for the magnetic flux from the stationary permanent magnet 18 through the coil sections 44a, 44b, 46a, and 46b in the event that the coil tape 22 is bonded to a non-ferrous, i.e. aluminum, rim.

Referring now to FIG. 9, the flux linkages and voltages associated with the generator are depicted. A single coil defined by 44a and 44b or 46a and 46b is designated in FIG. 9 as coil 78 and is positioned at successive locations as it moves left to right relative to stationary magnet 18. As can be seen, when the leading edge of a coil 78 is at position A, the coil 78 is just entering the magnetic field and the flux linkages are zero, while the rate of change of flux linkages is maximum, inducing the maximum voltages for a given polarity.

At position B, the coil 78 is directly over the first pole piece 84 of the permanent magnet 18 and maximum flux linkage occurs and the rate of change of flux linkages and consequently the polarity of the induced voltages inverts. With the leading edge of the coil 78 at position C the coil 78 is between the two pole pieces 84 and 86 and again has zero flux linkage. When the coil 78 is positioned directly over the second pole piece 86 with its leading edge at D, maximum flux linkage exists in the opposite direction to that which occurs when the leading edge of the coil 78 is at position B and the voltage generated within the coil 78 transitions in polarity. With the leading edge of the coil 78 at position E, the coil 78 is out of the magnetic field, flux linkage is again zero, and the voltage generated is at the same level and polarity as when the leading edge of the coil 78 first entered the magnetic field at position A. As one coil 78 reaches position E, another coil 78 in that same series of coils 78, i.e., 44a and 44b or 46a and 46b, is disposed at position A to continue generation of the same waveform.

The first circuit, defined by coil sections 44a and 44b, thus generates a voltage of a first polarity while a second circuit, defined by coil sections 46a and 46b generates a voltage of the same wave form but of opposite polarity, thus permitting the use of a rectifying circuit 26 (FIG. 3) in the preferred embodiment of the present invention to provide a continuous DC output voltage. When a coil such as series 44 is at position "E" a coil in series 46 is at position "C" and another coil in series 44 is at position "A".

The shape of the coils 78 and the shape of the pole pieces of the magnet 84 and 86 determine the shape of the generated waveform. Rectangular shapes provide a nearly square output voltage waveform which, when rectified produces a fairly constant DC voltage.

The gaps between the magnet and the wheel rim 12 are much shorter than the space between the magnet's pole pieces so that most of the magnetic flux goes across the gaps, as shown by the arrows.

It is understood that the exemplary automatic tire pressure monitor and inflation system described herein and shown in the drawings represents only a presently preferred embodiment of the invention. Indeed, various modifications and additions may be made to such embodiment without departing from the spirit and scope of the invention. For example, rather than the generator, DC motor, and compressor arrangement described, a gas generator or cartridge may be utilized to supply additional gas pressure to the tire as required. A chemical gas generator which provides the required gas as a result of a chemical reaction may be utilized. Alternatively, compressed gas may be provided from a reusable or disposable cartridge.

Alternatively, the compressor may be directly driven by the mechanical motion of the wheel rather than by a motor powered from a source of electricity such as a generator or battery. For example, a roller arrangement may be utilized wherein a roller is attached to the rotating wheel and rolls against a non-rotating member attached to the vehicle frame. The rotation from such roller may then be utilized to drive the compressor. Activation of the compressor may be on an intermittent basis wherein the roller only contacts the stationary part of the vehicle during a portion of its travel or while the brakes are applied.

Any means of converting the energy of the rotating wheel to mechanical power within the wheel to drive the compressor is suitable. Various inertial drives for the air compressor are also contemplated wherein the power to drive the compressor is derived from changes in the rate of rotation of the wheel. For example, a flywheel associated with the wheel is free to rotate with respect to the wheel. Motion of the wheel is gradually transmitted to the flywheel. For example, the flywheel could be rotatably mounted to the wheel. The angular momentum or inertia will keep the flywheel rotating at the same speed when the wheel changes speed of rotation. This will produce a relative motion between the flywheel and the wheel. This relative motion may be utilized to drive the compressor. Activating the compressor will couple energy between the wheel and the flywheel, causing the flywheel to approach the speed of the wheel. Thus, energy can be tapped only after speed changes, not during constant speed.

Alternatively, a coiled spring may be utilized. The acceleration (or deceleration) of a wheel can wind a spring, e.g. a coil spring, which powers the compressor when the acceleration (or deceleration) subsides. Thus, the compressor is activated each time the vehicle accelerates (or decelerates).

A spring-mass resonance assembly is also contemplated. One end of a spring is attached to the center of the wheel and a mass is attached to the other end of the spring. The mass is constrained to move radially within the wheel. The spring constant and mass are such that the assembly resonates at a frequency corresponding to a wheel rotation frequency for a moderate speed. Within the resonance speed range, the mass will oscillate radially, thus producing a relative motion within the wheel.

At low speeds, e.g. below 20 miles per hour, the spring is strong enough to hold the mass near the center. At higher speeds, e.g. over 30 miles per hour, the mass is held out against the rim by centrifugal force. The resonant range is between the low and high speeds. This oscillating motion drives the compressor. When the compressor is engaged, the oscillation will be damped by the load of the compressor, narrowing the resonant range.

To avoid imbalance or vibration of the wheel, a similar spring/mass arrangement is placed on the opposite side of the wheel and the spring/mass couples are forced to oscillate in synchronism, thus canceling the vibration forces. A quadrature arrangement would reduce vibration forces further.

A solenoid/centrifugal configuration is also contemplated wherein a solenoid draws a mass in toward the center of the wheel and centrifugal force urges the mass back out toward the periphery of the wheel when wheel rotation exceeds a predetermined threshold. This radial in-out motion drives the compressor. Electricity to drive the solenoid may come from any of the sources described herein in conjunction with the use of electric motors.

Various means for powering the electric motor which drives the compressor are contemplated. Such sources of electrical power can include a battery mounted on the wheel. The battery may be either replaceable or rechargeable. Alternatively, the vehicle battery may be utilized wherein various means for transferring electrical power from the non-rotating vehicle frame to the rotating wheel are contemplated.

For example, a transformer may be utilized to effect the transfer of electrical power to the rotating wheel. A ring (toroid) of magnetic material of a high permeability, is mounted axially on the wheel, or other member rotating with the wheel (e.g. brake drum), in an area of low magnetic permeability, e.g. aluminum. A rod of magnetic material is bent and mounted in a low permeability area on the non-rotating part of the vehicle, e.g. bearing housing, brake assembly, such that the two ends of the rod come close to the ring at opposite sides of the wheel, preferably 180 degrees apart. A winding on the non-rotating rod is the primary of the transformer and is energized by an electric alternator or chopper operating from the vehicle battery. One or two windings, preferably 180 degrees apart on the wheel, in series on the rotating ring comprise the secondary which applies the induced voltage to drive the electric compressor motor. The magnetic circuit consists of the rod, the two air gaps between the rod ends, the ring, and the two parallel paths through the ring between the rod ends.

Rotating contacts may also be utilized to transfer electrical power from the non-rotating vehicle frame to the rotating wheel assembly. The rotating contacts may be intermittent rather than continuous, thus providing intermittent operation of the compressor. Various types of rotating contacts are contemplated, including: a conventional rotating metal contact in which a ring on one member is in contact with a wiper on another member; conventional contacts described as above, but located within the brake assembly wherein contact is made when the brakes are applied or by a spring loaded contact that maintains contact when the brakes are not applied, to provide a clean location and a controlled movement that can make and break the wiping electrical contact; an electrical contact through conductive brake pads wherein contact is made as the brakes are applied such that the wiping nature of brake operation keeps the contacts clean.

Thus, it can be appreciated that various modifications and additions to the automatic tire pressure monitor and inflation system of the present invention are contemplated and do not depart from the spirit and scope of the invention.

What is claimed is:

1. A device for maintaining a desired inflation pressure within a tire of a vehicle, the tire mounted upon a wheel, said device comprising
   (a) a sensing means for sensing the inflation pressure of the tire;
   (b) an inflation means responsive to said inflation pressure sensing means, disposed upon said wheel, said inflation means increasing the pressure within said tire in response to said sensing means, said inflation means comprising an air compressor driven by an electric motor; and
   (c) a generator having coils disposed upon the wheel and having a magnet mounted upon a non-rotating portion of the vehicle such that movement of the coil proximate the magnet induces a voltage into the coil for driving the electric motor.

2. The device as recited in claim 1 further comprising a centrifugal intake vale in fluid communication with said air compressor for permitting the entry of air into said air compressor only when the wheel is rotating above a predetermined speed.

3. The device as recited in claim 1 further comprising a pressure relief valve for reducing the pressure within the tire when the inflation pressure reaches a predetermined limit.

4. The device as recited in claim 1 wherein said generator comprises a flexible tape having a flexible substrate having said coils formed thereon 5. The device as recited in claim 4 wherein said generator further comprises an adhesive layer formed upon one surface of said flexible tape to facilitate attachment of said tape to a rotating portion of the wheel.

6. A device for maintaining a desired inflation pressure within a tire of a vehicle, the tire mounted upon a wheel having a rim the device comprising
   (a) a pressure sensor in fluid communication with the tire for monitoring inflation pressure thereof;
   (b) a motor responsive to said pressure sensor;
   (c) an air compressor driven by said motor and in fluid communication with said tire for increasing the inflation pressure thereof; and
   (d) a generator comprising:
      (i) a plurality of coils formed upon a flexible substrate, said flexible substrate disposed upon the rim; and
      (ii) a permanent magnet mounted upon a non-rotating portion of the vehicle such that the coils of said flexible substrate pass through the flux of said magnet to generate an electrical current for powering said motor.

7. The device as recited in claim 6 wherein said air compressor and said motor are disposed entirely within the volume defined by the tire and rim.

8. The device as recited in claim 6 wherein the coils comprise two series of alternating coils, each series electrically connected in series such that two coil circuits are defined thereby and wherein the voltage waveform induced in one series of coils is 180 degrees out of phase with the voltage waveform induced in the other series of coils.

9. The device as recited in claim 8 wherein each of said coils comprise a first coil section formed upon a first side of said flexible substrate and a second coil section formed upon a second side of said flexible substrate wherein said first and second coil sections are connected in series to define a single coil.

10. The device as recited in claim 9 wherein said first and second coil sections are connected by vias passing through said flexible substrate.

11. The device as recited in claim 6 further comprising a rectifier such that the permanent magnet cooperates with coils to produce a pulsed DC output voltage.

12. The device as recited in claim 6 wherein a plurality of coils provide out of phase voltages which are rectified by said rectifier to provide a substantially constant DC voltage.

13. The device as recited in claim 6 wherein said coils are generally rectangular in shape such that the voltage generated by the device is substantially square in waveform.

14. The device as recited in claim 9 further comprising a layer of high magnetic permeability material disposed in laminar juxtaposition to said flexible substrate such that the flux from said magnet is directed therethrough to maximize flux linkage.

* * * * *